United States Patent [19]

Mills

[11] Patent Number: 4,786,037
[45] Date of Patent: Nov. 22, 1988

[54] ARRANGEMENT FOR A SPRING SUSPENSION SYSTEM

[76] Inventor: Mike Mills, 2, Vicarage Stables, Poulton Cirencester, Glos. GL7 5HS, England

[21] Appl. No.: 916,677
[22] PCT Filed: Dec. 19, 1985
[86] PCT No.: PCT/SE85/00534
   § 371 Date: Oct. 15, 1986
   § 102(e) Date: Oct. 15, 1986
[87] PCT Pub. No.: WO86/04125
   PCT Pub. Date: Jul. 17, 1986

[30] Foreign Application Priority Data

Jan. 11, 1985 [SE] Sweden .................. 8500134

[51] Int. Cl.⁴ .............................................. F16F 5/00
[52] U.S. Cl. .............................. 267/226; 188/322.14; 267/64.15; 267/127
[58] Field of Search .............. 188/322.14; 267/64.13, 267/64.14, 64.15, 64.26, 126, 127, 221, 224, 225, 226

[56] References Cited

U.S. PATENT DOCUMENTS 3,476,354  11/1969  Stubblefield .............. 267/64.26 X Primary Examiner—Duane A. Reger

[57] ABSTRACT

Included in a spring suspension system is a main spring (1) for taking up a load or for supporting a mass. The spring is arranged on a cylinder (4) which contains a piston (5). The piston or the area of the piston rod operates via hydraulic oil against the effect of a spring function, the purpose of which is to ensure that the fluid is under pressure at all times. A moving device (7) interacts both with the fluid an with the aforementioned main spring (1), which for this purpose is so arranged as to provide the double function of serving both as a load/mass supporting spring and as a compression spring.

9 Claims, 1 Drawing Sheet

U.S. Patent
Nov. 22, 1988
4,786,037
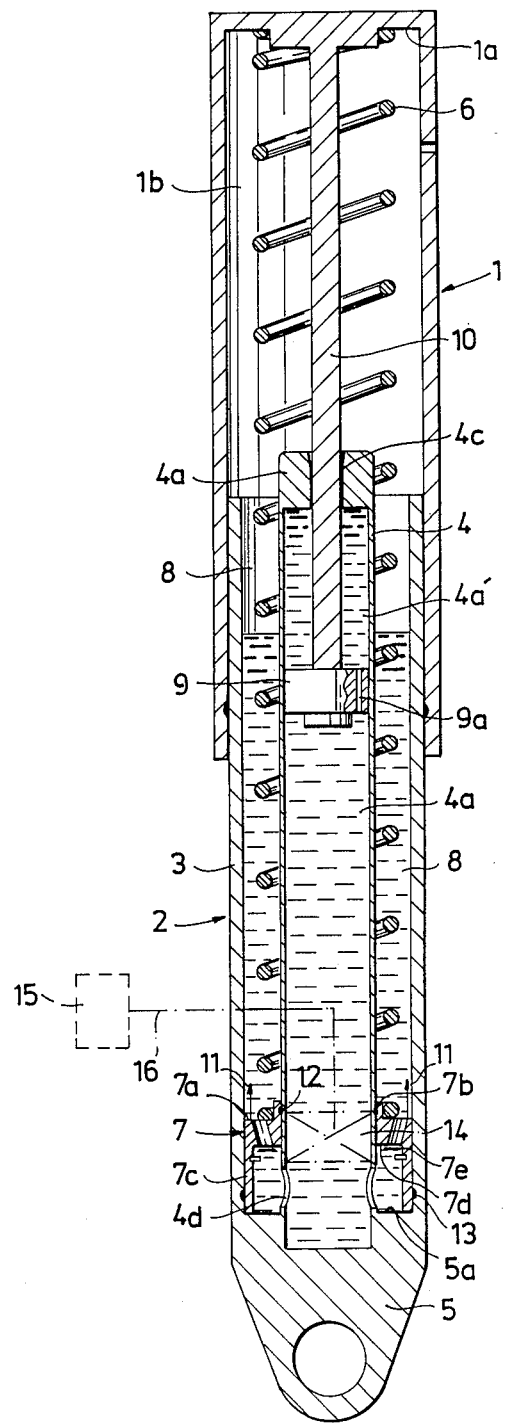

ARRANGEMENT FOR A SPRING SUSPENSION SYSTEM

BACKGROUND OF THE INVENTION

The present invention relates to an arrangement for a spring suspension system which contains a load-absorbing or a mass-supporting mechanical main spring and a unit consisting of inner and outer cylinders. In such arrangement a piston and/or a piston rod, for the purpose of providing a damping function, works in an incompressible fluid, for example hydraulic oil, inside a working space, and with its corresponding area, via the fluid, works against the effect of a spring function produced by the main spring with the help of a moving device capable of being actuated through its first side by the main spring and capable of being actuated through its second side by the incompressible medium.

The application of maintaining the incompressible fluid during the return stroke of the piston is known in art. In the case of shock absorbers, for example, the arrangement of a gas cushion (gas spring) has been disclosed which is separated from the incompressible fluid with the help of a floating piston, one side of which is acted upon by the fluid, and the other side of which is acted upon by the gas cushion. The compression ensures that no gas is released within the fluid, which in turn provides the necessary conditions for sound function.

Also previously disclosed in relation to spring suspension systems for motor vehicles is the use of a moving device or a device which is capable of longitudinal displacement, the respective sides of which are acted upon by the main spring and by the incompressible medium. The main spring contributes to, or produces the compression of the fluid.

SUMMARY OF THE PRESENT INVENTION

The present invention is intended for use, amongst other things, in front fork assemblies in which the piston speed is high, for example 10 m/sec. The use of gas springs as compression springs for the operating fluid is problematical in such case because the piston rod is required to operate through sealing devices which at the same time separate the gaseous and liquid media. Sealing devices of this kind wear rapidly, imposing an unacceptable requirement for frequent service intervals for the system as a whole. Furthermore, the assembly as a whole is technically complex. The use of a moving device or a device which is capable of longitudinal displacement as described above is not obvious, since what is involved is the ability to avoid inappropriate changes in the damping characteristic because the piston speed may be higher during compression than during the return stroke.

The present invention provides for solution of above problems by use of a moving device, the possibility is afforded of getting to grips with the wear problem. At the same time very good damping characteristics can be achieved in front fork assemblies and similar assemblies with high piston speeds.

According to the present invention piston rod is provided with a bearing which, on return strokes of the piston, will permit the fluid to pass from the working space for the piston or the piston rod to a space under atmospheric pressure on the first side of the moving device, with the moving device containing a one-way valve which permits filling of the fluid from the space under atmospheric pressure to a space belonging to the working space beneath the piston whenever the return strokes of the pressure give rise to a tendency for low pressure to occur in the last-mentioned space.

In one preferred embodiment the device consists of an annular unit so arranged as to be capable of longitudinal displacement on the cylinder containing the piston, the cylinder being provided for this purpose with one or more openings via which the fluid is connected to this annualar unit. The unit may be regarded as constituting a movable support for the main spring, which attempts to force the unit towards an initial position or towards a position in which it is counterbalanced by the fluid pressure. A helical spring with normal spring characteristics can be used as the main spring, which in this case will function as a progressive return spring for the piston/unit.

At the openings, which should preferably be arranged at one end of the cylinder, it is permissible to arrange one or more devices for influencing the damping, each of which can be adjustable from the outside of the cylinder.

The device or the unit can be arranged in such a way that, as it moves, it forms a variable sealed space for the fluid.

The present invention is particularly applicable to front forks of double-tube construction in which the main spring can extend within a space between an inner and an outer cylinder. The moving device is arranged at one end of the double tube where the spring interacts with the moving device and where the opening/openings is/are arranged. Devices for determining the damping may be arranged at such end, and can be actuated from the outside. The double-tube construction may consist of an inner telescopic component within a telescopic front fork assembly.

The possibility is offered by the present invention of achieving a technically simple solution to, for example, the front fork suspension system of a motor cycle, or combined spring suspension and shock absorber systems, etc. The maximum length of stroke can be utilized. Sealing of the hydraulic oil is simple, and reliable lubrication of the plain bearing seal, the piston rod and other moving parts can be achieved, guaranteeing a long, maintenance-free service life. The presence of the openings enables an adjustment facility for the damping to be provided.

In front fork assemblies, for example, it is possible in a simple fashion to avoid the release of gas in the hydraulic oil, thereby achieving effective operation of the piston. Also simply avoided are variations in damping characteristics attributable to the fact that the piston movements occur at a higher speed during compression than during the return stroke. The novel solution is superior in every respect to previous solutions for front forks which were designed around the use of spindle rods for controlling the rate of discharge of the hydraulic oil.

DESCRIPTION OF THE DRAWINGS

An embodiment of the invention is described in greater detail with reference to the accompanying drawings, in which:

The FIGURE illustrates in longitudinal section the novel arrangement applied to a front fork spring for a motorcycle.

DESCRIPTION OF THE PREFERRED EMBODIMENT AND BEST MODE OF CARRYING OUT THE INVENTION

The FIGURE illustrates the present invention applied to a telescopic front fork suspension (springing) system, for example for a motor cycle. An outer telescopic component is identified by the reference 1, and an inner telescopic component by the reference 2. The inner telescopic component 2 may be regarded as constituting a double-tube assembly, in which an outer component 3 and an inner component 4 are included. The outer telescopic component 1 is attached to the vehicle wheel.

A main spring which takes up a load or supports a mass is identified by the reference 6. The spring is of the helical spring type with conventional spring characteristics. The spring is so arranged as to be pre-tensioned between an inner surface 1a of the outer telescopic component 1 and a device 7 so arranged as to be capable of moving within a space 8 situated in the double-tube assembly (3, 4), parts of the spring 6 extending down into the space 8 against lower parts of the double-tube assembly where the moving device is arranged.

The inner component 4 constitutes with its internal volume 4a, 4a' a working space for a piston 9. The spring encloses the inner component or the cylinder 4 with the associated piston 9, the piston rod 10 of which is securely attached to the inner telescopic component 1 at its retaining surface 1a. The piston rod 10 is supported in a bearing component 4a belonging to the inner component 4, the bearing support being identified by the reference 4c.

The cylinder spaces 4a' and 4a respectively above and below the piston are filled with an incompressible fluid, for example hydraulic oil. A space 1b inside the outer telescopic component is connected not only to the surrounding atmosphere, but also to the space 8. The bearing 4c for the piston rod at the upper end of the inner component which faces the mounting 2 is arranged with a clearance so as to provide a leakage clearance with the space 1b. The piston 9 is provided with one or more passageways 9a between the upper and lower sides of the piston. The damping of the piston is influenced by means of these passageways. The incompressible fluid which is able to leak through the bearing 4c is also filled into parts of the space 8. The fluid is kept inside the space by the spatial position of the front fork, and the space is connected to the atmosphere in a manner not indicated here.

The moving device, in the case illustrated in the form of the annular device 7, is so arranged as to be capable of longitudinal displacement on the outside of the cylinder 4, at the mounting 5. The device shown in FIG. 1 is in an initial position, from which it displaceable in the direction of the arrows 11. The initial position is determined by means of a retaining device/heel/stop 5a on the mounting 5. The device 7 exhibits a seat 7a for the spring 6. The device also comprises a first component 7b bearing against an outer surface of the cylinder 4, and a second component 7c bearing against an inner surface of the outer telescopic component 3. The second component 7c interacts with the retaining surface 5a.

The device 7 may be regarded as exhibiting a first side, against which the spring 6 acts to force the device towards its initial position. The device is also provided with an internal surface 7d which, through one or more openings 4d in the wall of the cylinder 4, is exposed to the oil inside the space 4a. The device may be regarded as having a second side through which the fluid, depending on the downward movement of the piston in the FIGURE, attempts to force the device 7 in the direction of the arrows 11 against the effect of the spring 6.

The device is sealed against the outer wall of the cylinder by means of seals 12, and against the outer surface of the outer telescopic component by means of seals 13 of a known type.

When the piston 9 is pressed downwards from the position illustrated, the device 7 will be forced upwards. The spring 6 will keep the fluid inside the space 4a under pressure at all times, including when the piston subsequently returns to its initial position. The device 7 may be regarded as constituting a moving mounting for the spring 6, and this is utilized in such a way that it serves both as a load/mass supporting spring and as a compression spring, for example in order to prevent the release of gas in the fluid. The movement of the device 7 from an initial position is limited so that the opening-/openings is/are not exposed, but so that the fluid remains enclosed at all times. As an alternative to a position balanced against the fluid pressure, the unit can operate in an initial position achieved by means of the stop device 5a.

The device is equipped for this purpose with a one-way valve 7e to prevent the passage of fluid from the space 4a into the space 8. The fluid is allowed to pass in the other direction, however. The passage of fluid is provided in order to permit fluid to be introduced from the space 8 into the space 4a.

It is important in a front fork spring for the hydraulic oil to be under pressure inside the space 4a during movement of the piston. The support bearing 4c will, in accordance with the above, permit fluid to pass at least to a certain extent from the space 4a' above the piston to the space 1b and the space 8.

If the return stroke of the piston 9 produces a tendency for low pressure to be created in the space 4a, fluid will be introduced from the space 8 through the one-way valve 7e in the device. The fluid in the space 8 is under atmospheric pressure which is thus able to compensate for any drop in pressure in the space 4a.

In the case illustrated with a conventional helical spring 6, this constitutes a progressive return spring (a function increasing with the spring constant) for the unit/piston. The one-way valve may be of a known type.

The present invention may also be used in conjunction with more distinctive shock absorber assemblies. The FIGURE illustrates the possibility of including adjustable damping devices 14, which should preferably be arranged at the openings 4d. Adjustment can be effected by means of devices 15 which are capable, preferably as a result of manual actuation, of influencing the damping device 14 through a mechanical or electrical connection 16.

The present invention is not restricted to the embodiments described above, but may be modified within the scope of the following patent claims and the idea of invention.

I claim:

1. A device for a spring suspension system, comprising:
a unit having a first and a second part, said second part including an outer cylinder and an inner cylinder disposed inside said outer cylinder, said outer and inner cylinders defining therebetween a first space filled with incompressible fluid and being connected with a second space in contact with surrounding atmosphere, said first and second space being under atmospheric pressure;

a main spring disposed on said inner cylinder for compressing said incompressible fluid;

a piston with an associated piston rod for providing a damping function, working in said incompressible fluid in a third working space defined inside said inner cylinder, said piston being supported in a bearing so dimensioned as to allow leakage of said incompressible fluid from said third working space into said second space under atmospheric pressure upon return strokes of said piston;

a movable device located in said first space between said inner and outer cylinders with main spring acting on one side, and said incompressible fluid acting on another side of said movable device and against said spring, said movable device including a one-way valve allowing flow of said incompressible fluid from said first space into said third working space at the side below said piston whenever low pressure occurs inside said space.

2. A device according to claim 1 wherein said main spring also functions as progressive return spring.

3. A device according to claim 1 wherein such movable device is in the form of an annular member which is longitudinally displaceable in said first space between said cylinders and wherein said inner cylinder is provided with at least one opening.

4. A device according to claim 1 further comprising means for influencing the damping of said piston which is accessable for actuation from the outside of said outer cylinder.

5. A device according to claim 4 wherein said means for influencing said damping of said piston is arranged at said at least one opening in said inner cylinder.

6. A device according to claim 5 wherein said at least one opening is situated on the end wall of said inner cylinder facing the bottom surface of said piston.

7. A device according to claim 3 wherein said main spring extends at least partially within said first space between said inner and outer cylinders and said movable device and said opening are situated at one end of said second part of said unit.

8. A device according to claim 1 wherein said inner and outer parts form inner and outer telescopic components, said rod of said piston being attached to said outer telescopic component and one end of said main spring being supported against an inner upper surface inside said outer telescopic component.

9. A device according to claim 8 wherein said second space is defined inside said outer telescopic component.

* * * * *